UNITED STATES PATENT OFFICE.

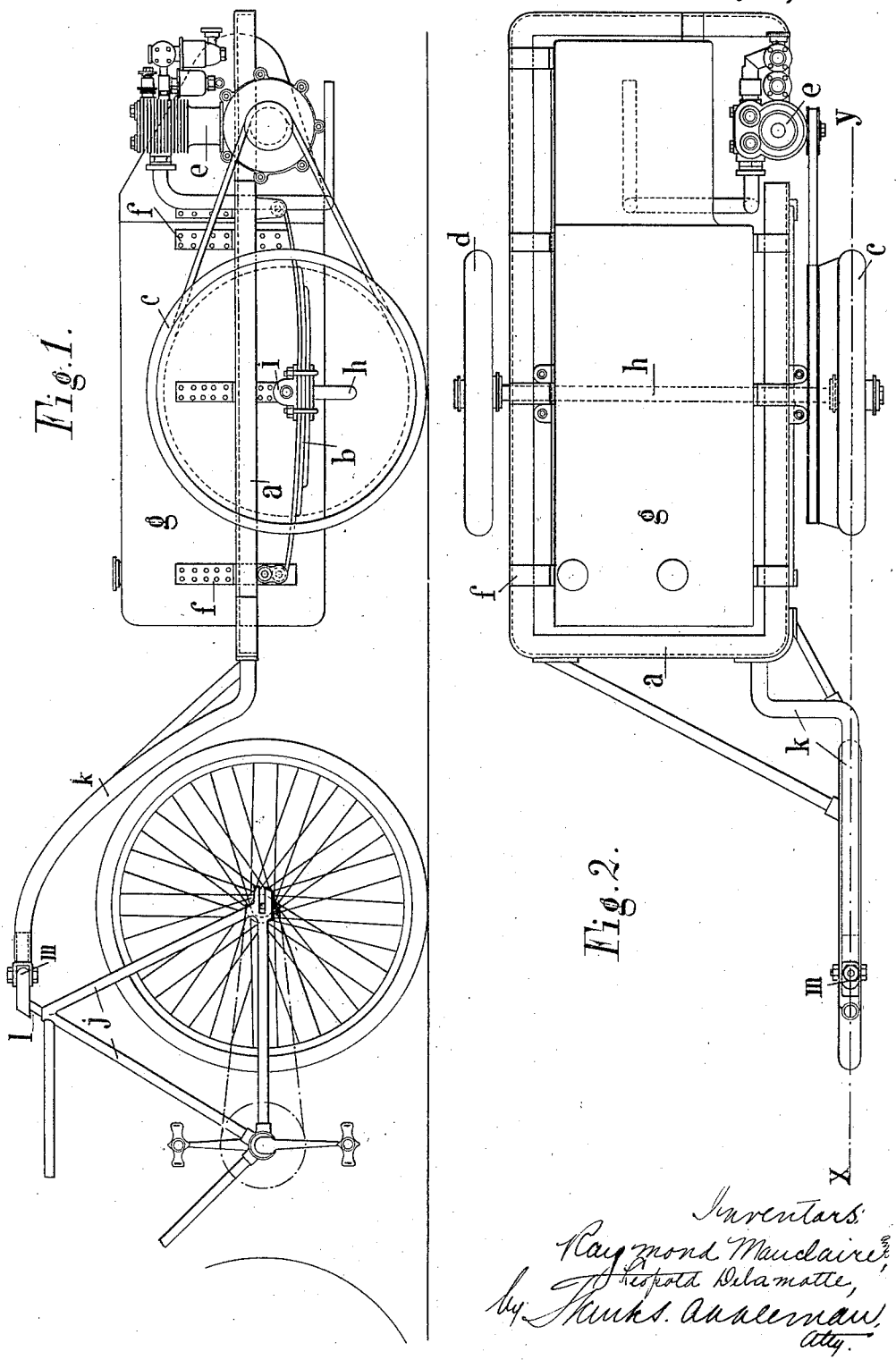

RAYMOND MAUCLAIRE, OF ASNIÈRES, AND LÉOPOLD DELAMOTTE, OF PARIS, FRANCE.

AUTO-PROPELLED VEHICLE.

1,341,379.　　　　　Specification of Letters Patent.　　Patented May 25, 1920.

Application filed November 23, 1917. Serial No. 203,565.

*To all whom it may concern:*

Be it known that we, RAYMOND MAUCLAIRE, a citizen of the French Republic, residing at 12 Avenue d'Argenteuil, Asnières, in the Department of Seine, France, and LÉOPOLD DELAMOTTE, a citizen of the French Republic, residing at 3 Rue d'Olivet, Paris, in the Department of Seine, France, have invented a new and useful Improvement in Auto-Propelled Vehicles, of which the following is a specification.

This invention has for its object a self-propelling vehicle forming a detachable carrier capable of being fitted instantaneously to the rear of a bicycle or a cycle of any kind, especially characterized by the fact that while the vehicle is traveling in a straight line the center of the motor wheel of the carrier and the center of the rear wheel of the cycle are both situated in the same vertical plane. Another characteristic of the invention consists in the arrangement that the connection between the bicycle and the self-propelling carrier is effected by means of a non-rigid coupling adapted to the cycle in such a manner that while the push of the motor acts during the travel in a straight line in the vertical plane of the motor wheel of the self-propelling vehicle, on the other hand the self-propelling vehicle and the cycle can each move relatively to one another as required by accidents or the curves of the road.

A construction of the invention is illustrated diagrammatically in the accompanying drawing, in which—

Figure 1 shows an elevation, and

Fig. 2 shows a plan view.

The apparatus comprises essentially a chassis $a$ resting by means of the springs $b$ upon two wheels the one wheel $c$ being the driving wheel and the other $d$ a free wheel.

This chassis $a$ supports at the rear at one side the motor $e$, which transmits motion by means of a belt to the driving wheel $c$, and at the other side attached by supports $f$ $f$, either a box $g$ for transport purposes (as shown in the diagram), or a carriage adapted for travelers.

It is preferable, for the purpose of lowering the center of gravity as much as possible, to crank the axle $h$ and to mount the bearings $i$ upon the main blades of the springs $b$. The box $g$ or the like is fixed in the interior of the chassis $a$ and between the cranked parts of the axle.

This vehicle is placed behind the cycle $d$ and the coupling is assured by means of a removable part such as $k$ attached on the one hand to the front of the chassis $a$ and on the other hand preferably to the tube or bar of the saddle $l$ of the cycle.

The part $k$ is mounted upon the side of the chassis carrying the driving wheel $c$ and it is curved or elbowed so as to place the middle plane of the cycle exactly in line with the middle plane $x$ $y$, of the aforesaid driving wheel.

The connection of the part $k$ with the saddle-tube is obtained by means of a non-rigid connection $m$ such as an Oldham joint or other similar connection, allowing the self-propelled vehicle and the cycle respectively all the relative movements necessitated by accidents or bends in the track.

The petrol and oil reservoirs and also the ignition battery are placed at the front of the box $g$ to counter-balance the weight of the motor placed at the back. A brake mechanism of suitable construction is attached to the vehicle.

All the controlling devices (ignition, decompression, braking) are arranged either upon the propelling vehicle, the bicycle or the cycle as may be most convenient for the hand of the driver who sits on the machine and directs it in the ordinary manner.

It should be clearly understood that the present description and the diagram accompanying it merely indicate the essential features of the invention, and that this invention is susceptible in its different application of variations of detail corresponding to the uses to which it is to be put, without altering in any way its essential characteristics.

What we claim is:—

1. In combination with a cycle, a self-propelled vehicle having a driving wheel on one side and a free wheel on the other, said driving wheel in alinement with the vertical plane of the cycle wheels, and a coupling attaching the said vehicle to the said cycle and adapted to allow of each adjusting itself to curves in the track.

2. In combination with a cycle, a rearwardly attached self-propelled vehicle comprising an internal combustion engine, a chassis supporting said engine, springs secured to said chassis axle blocks fixed above said springs a cranked axle adapted to pass through said axle blocks a driven wheel on the end of said axle in operative connection with said engine, a free wheel on the other end of said axle and a car on said chassis, the said self-propelled mechanism so attached to the cycle as to be capable reciprocally of adjusting their motion to compensate for curves and inequalities in the road.

In testimony whereof we sign our names to this specification in the presence of two subscribing witnesses.

RAYMOND MAUCLAIRE. [L. S.]
LÉOPOLD DELAMOTTE. [L. S.]

Witnesses:
  HENRI BLOUIN,
  ANDRÉ BLOUIN.